United States Patent
Katz

(10) Patent No.: US 10,204,165 B2
(45) Date of Patent: Feb. 12, 2019

(54) NETWORK-BASED GATHERING OF BACKGROUND INFORMATION

(71) Applicant: Bolt Solutions Inc., New York, NY (US)

(72) Inventor: Ari Katz, Savyon (IL)

(73) Assignee: Bolt Solutions Inc., New York, NY (US)

( * ) Notice: Subject to any disclaimer, the term of this patent is extended or adjusted under 35 U.S.C. 154(b) by 495 days.

(21) Appl. No.: 14/924,869

(22) Filed: Oct. 28, 2015

(65) Prior Publication Data

US 2016/0117401 A1 Apr. 28, 2016

Related U.S. Application Data

(60) Provisional application No. 62/069,431, filed on Oct. 28, 2014.

(51) Int. Cl.
G06F 17/30 (2006.01)

(52) U.S. Cl.
CPC .... G06F 17/30867 (2013.01); G06F 17/3087 (2013.01)

(58) Field of Classification Search
CPC ......... G06F 17/30864; G06F 17/30867; G06F 17/30528; G06F 17/30268
USPC ............................ 707/706, 999.003, 999.004
See application file for complete search history.

(56) References Cited

U.S. PATENT DOCUMENTS

| | | | |
|---|---|---|---|
| 6,952,806 B1 * | 10/2005 | Card | G06F 17/30716 707/999.102 |
| 8,584,139 B2 | 11/2013 | Katz et al. | |
| 2007/0245035 A1 * | 10/2007 | Attaran Rezaei | G06F 17/30864 709/238 |
| 2008/0228696 A1 * | 9/2008 | Fano | G06Q 10/06 |
| 2008/0228803 A1 * | 9/2008 | Fano | G06Q 10/10 |
| 2008/0267505 A1 * | 10/2008 | Dabet | G06F 17/243 382/181 |
| 2012/0005105 A1 * | 1/2012 | Beier | G06Q 10/06 705/303 |
| 2012/0023330 A1 * | 1/2012 | Fink | H04L 9/0841 713/161 |
| 2012/0083285 A1 * | 4/2012 | Shatsky | G01S 19/48 455/456.1 |
| 2014/0282016 A1 * | 9/2014 | Hosier, Jr. | H04W 4/08 715/733 |
| 2014/0298151 A1 * | 10/2014 | Fitzpatrick | G06F 17/243 715/226 |
| 2016/0171403 A1 * | 6/2016 | Shen | G06Q 10/06 705/7.22 |

* cited by examiner

Primary Examiner — Dung K Chau

(57) ABSTRACT

A method of network-based query formulation on a plurality of computers networked together, the method comprising: obtaining a request from an end user, the request requiring predetermined information for fulfillment; obtaining seed information regarding said request in a primary search from an information source associated with said end user; using said seed information to build at least one query for said predetermined information; applying said at least one query to at least one additional information source to obtain secondary information relating to said request; and amalgamating said seed and secondary information to fulfill said request.

17 Claims, 7 Drawing Sheets

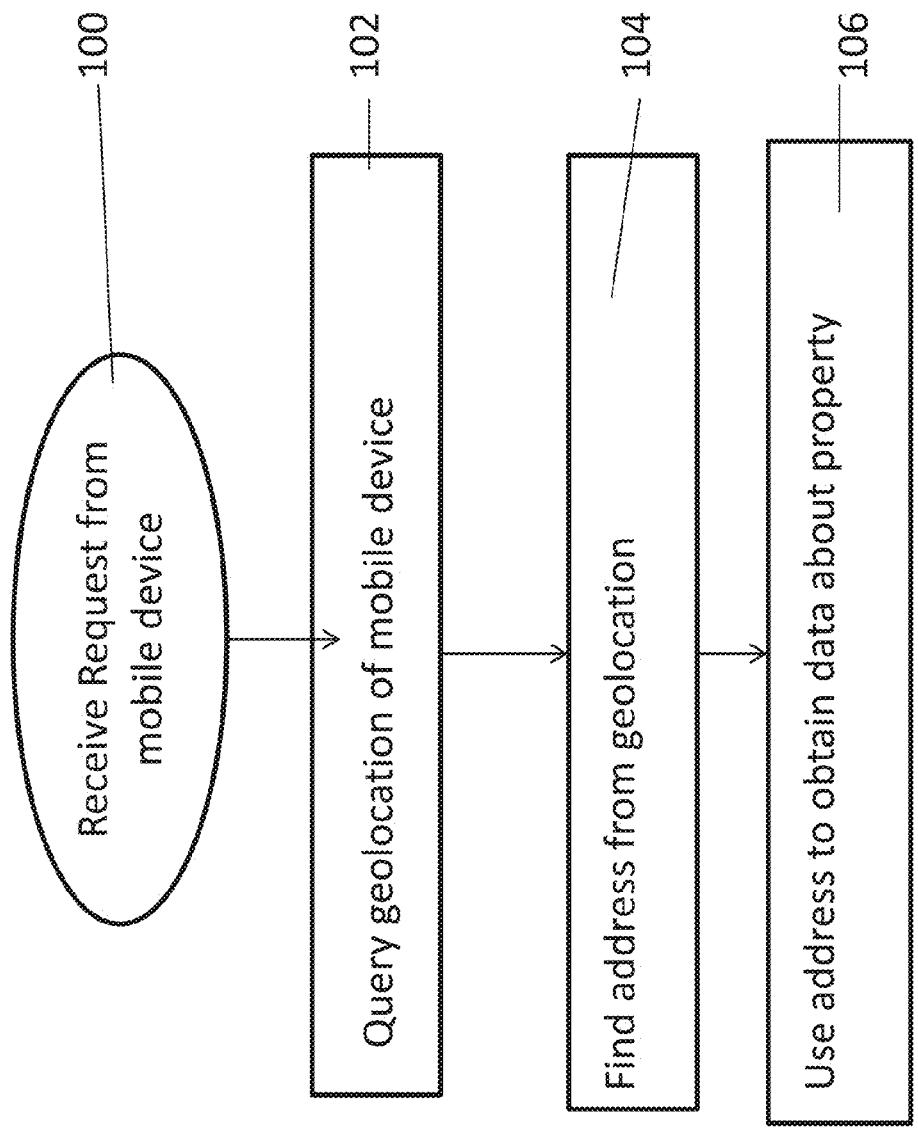

NETWORK-BASED GATHERING OF BACKGROUND INFORMATION

RELATED APPLICATION

This application claims the benefit of priority under 35 USC 119(e) of U.S. Provisional Patent Application No. 62/069,431 filed Oct. 28, 2014, the contents of which are incorporated herein by reference in their entirety.

FIELD AND BACKGROUND OF THE INVENTION

The present invention, in some embodiments thereof, relates to a network-based gathering of background information and, more particularly, but not exclusively, to such a method where the network is the Internet.

The Internet offers unprecedented access to information. When thinking of querying the Internet one generally thinks of a model in which a query is input by a user and leads to one or more answers provided at different locations, one or two of which are most relevant.

Another model of querying the Internet is to start with a query leading to a first site and then follow links from the first site to subsequent sites. Such a model is known as surfing and is very intuitively supported by the World Wide Web.

A third model does not assume a localized answer. A query may lead to different locations on the Internet, the locations having different information that needs to be compiled together in order to answer the query.

A common feature of all of these models is the initial query, generally provided by a user. The query is used as the basis of a search which is carried out over the Internet using considerable computing power.

The search itself is carried out using databases gathered automatically from the Internet, generally in a non-query-based general search trawling information from all over the Internet.

The need for a query makes Internet searching something of an art form, and makes it difficult to provide fully automated Internet Information gathering, yet in order to provide automated information gathering, automatic query generation is required, and for such automatic query generation some level of a semantic understanding of the data is necessary. One of the problems with trying to semantically understand data on the Internet is that web sites are independently constructed and have different ways of presenting information so that a computerized system has difficulty finding even the same information from different websites.

Projects, such as the EU-funded Okkam project use semantics to people and machines to find, share and integrate information more easily. With Okkam, the main objects being scanned are no longer documents that just happen to contain certain keywords, but entities, such as people, locations, organizations or events.

The core Okkam infrastructure stores and makes available for reuse so-called global identifiers which can be applied to and used by anyone or anything across formats and applications. The project is concerned with distributed information and knowledge management.

A goal recognized by some of the stakeholders in the Okkam project is to allow a searcher to integrate Web 2.0 type information that a user may have placed on different social media sites. Okkam envisages achieving such integration by providing users with their own global identifiers.

If the global identifiers are not used for any reason then integrating the information is not possible using the Okkam methodology.

U.S. Pat. No. 8,584,139, to Ari Katz et al, filed May 22, 2007 teaches apparatus and a method for connecting incompatible computer systems. Specifically, a proxy is located on a network between one or more client applications and a server application, comprises an input unit for receiving input data from a first client application and from a server application; a modifying unit for modifying server data by insertion of client data; and a handling unit for submitting the modified content data to the client to allow the client to review and further modify the client data within the server data and submit the modified data back to the proxy for subsequent submission to the server. The proxy thus uses client data to prefill web forms, using mapping and the like, which the client can then review and modify before submission to the server, thus avoiding substantial rekeying.

The above cited document teaches compatibility between closed sets of computer systems but fails to discuss searching and query formulation.

SUMMARY OF THE INVENTION

The present embodiments relate to information gathering in a multi-stage computerized process, where the first stage obtains data that forms the queries for the second stage, and the second stage obtains data that may form queries for the third stage. The first stage consists of general data gathering—without an explicit query, but from a specified location. The second stage involves formulating the data gathered in the first stage into explicit queries and then carrying out searching on a set of Internet sites based on those queries. The queries may be specific pieces of background information and the secondary sites may be specialist sites which are intended to be searched using that specific information, or Web 2 or social media sites containing background information relating to the subject of the request.

According to an aspect of some embodiments of the present invention there is provided a method of network-based data amalgamation on a plurality of computers networked together, the method comprising:

obtaining a request from an end user, the request requiring predetermined information for fulfillment;

obtaining seed information regarding said request in a primary search from an information source associated with said end user;

using said seed information to build at least one query for said predetermined information;

applying said at least one query to at least one additional information source to obtain secondary information relating to said request; and amalgamating said seed and secondary information to fulfill said request.

In an embodiment, said request relates to a required service, said required service requiring to be ordered using said predetermined information in a preset query involving a plurality of information fields.

The method may comprise presenting said primary and secondary information to said end user for editing and confirmation; and upon receiving said confirmation, sending said amalgamated primary and secondary information to one or more service providers to obtain tenders for said required service.

In an embodiment, said amalgamated primary and secondary information is placed within fields on a form designed for said preset query, any field for which information has not been found being left blank for filling in by said end user during said editing.

In an embodiment, said primary information comprises contact information, the contact information seeding said query formation.

In an embodiment, searching using said query is carried out via an application programming interface (API) of a web search engine.

An embodiment may involve adding a new data source to said at least one additional data source for said search query search by introducing an API call and providing support for unrecognized data fields of said new data source.

In an embodiment, said query search comprises a search for data held within fields, said fields being identified by metadata.

In an embodiment, said primary search is a structured data search looking for data held within fields on said information source associated with said end user, said fields being identified by metadata.

An embodiment may involve selecting between a plurality of different metadata tags in general use, to identify required fields of said information source associated with said end user.

In an embodiment, said amalgamating comprises retrieving information from a plurality of API calls and combining said information into a single structure for said presenting to said end user.

According to a second aspect of the present invention there is provided a method of obtaining background information relating to a request comprising:

obtaining identifying information of a requesting party;

using said identifying information to form at least one search query; and using said search query to electronically search a predetermined set of data sources over an electronic network to obtain said background information; and amalgamating said predetermined background information to fulfill said request.

In an embodiment, said identifying information comprises a web site URL, said website URL being inserted as a formulated query into a search engine.

In an embodiment, said identifying information comprises geolocation information.

An embodiment may involve translating said geolocation information into an address.

An embodiment may involve using said address to obtain information about a building identified by said address.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data.

Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 7 is a simplified flow chart illustrating a procedure in which geolocation information is used to complete a request according to an embodiment of the present invention.

DESCRIPTION OF SPECIFIC EMBODIMENTS OF THE INVENTION

Figure 1:
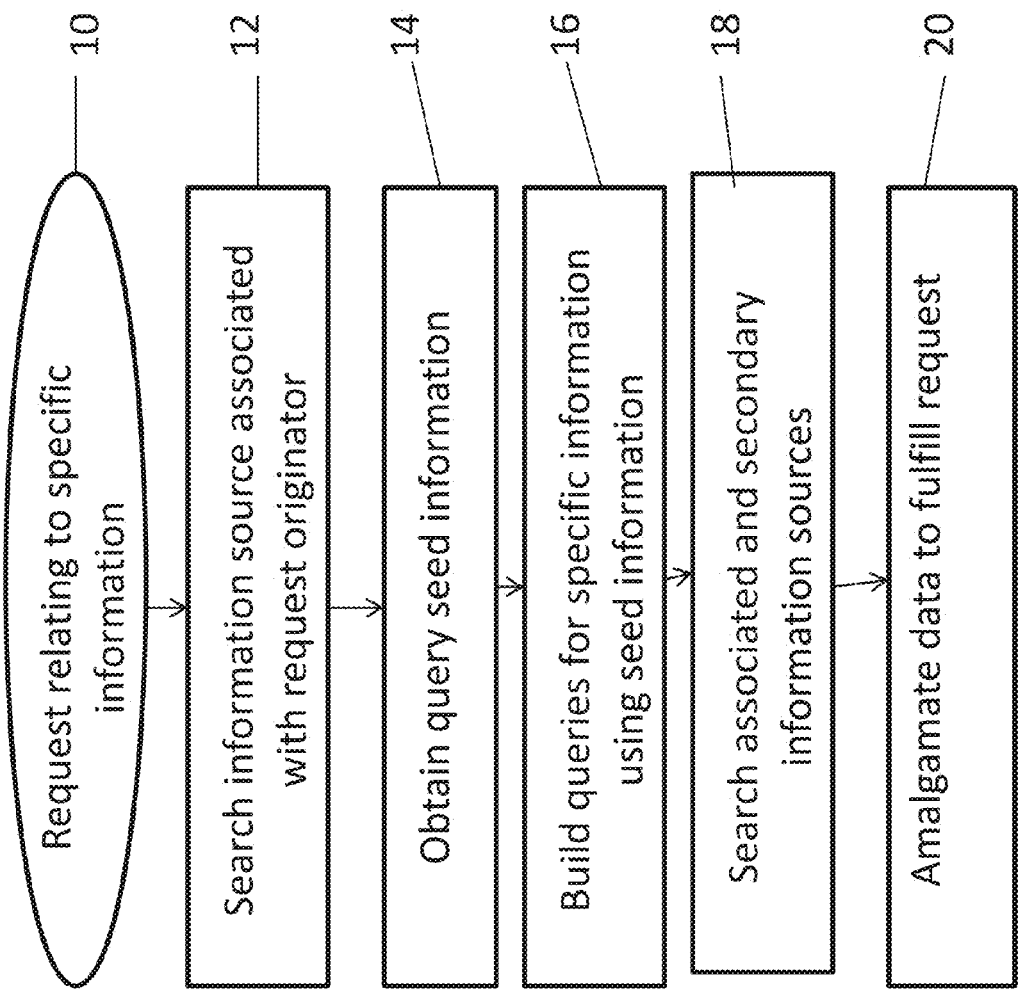
FIG. 1 is a simplified flow chart illustrating a method of formulating a query and obtaining background data for a request, according to an embodiment of the present invention.

The present invention, in some embodiments thereof, relates to a network-based gathering of background information and, more particularly, but not exclusively, to such a method where the network is the Internet.

The present embodiments provide automatic searching relating to a request that requires specified background information in order to be fulfilled. Some primary information about the requestor is obtained and used to formulate queries to obtain the necessary background information by carrying out searches over the Internet, in particular on sources such as social media sources.

For example a user may request a service. The service requires a form to be filled in, and then the form can be sent to various service providers for tender. The present embodiments obtain seed information from a source connected with the user requesting the service. The seed information is used to form an initial query which returns some of the information needed for the form and may also allow further queries to be formulated. Eventually the form is filled in as much as possible from searches of primary and secondary information sources and forwarded to the requesting user for completion or approval.

The secondary information sources may be social media sites and other Web 2 type information sources. Such sites contain enormous amounts of information, often provided by users themselves. The primary information source may be a user's own website, such as a website belonging to the business requesting the service. Often all of the information needed to fill in a web form is found on the two types of information source, and the present embodiments may provide a way of amalgamating all of the information.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1 is a simplified flow chart illustrating a method of network-based query formulation and amalgamating of the resulting information on a plurality of computers networked together such as the Internet.

Initially, as in box 10, a request is obtained from an end user. The request requires predetermined information for fulfillment. Thus, the existence of the request defines the information that needs to be obtained.

In box 12, seed information regarding said request is obtained in a primary search from an information source associated with the end user. Thus, the requestor may be a business and seed information may be the name or contact details of the requestor. Such information as name and contact details tend to be stored in a fairly standard way on business websites, such as under a menu heading "contact us" and can be obtained with reasonable confidence—box 14—without needing specific knowledge of the web site.

The seed information is then used to build queries to find the information needed for the request—box 16.

In box 18, the query is applied to one or more additional information sources to obtain more information relating to the request. The additional information sources may be Web 2—type information sources such as social media websites. The initial queries may lead to new information which may lead to new queries.

In box 20, the data obtained is amalgamated to fulfill the request.

Figure 2:
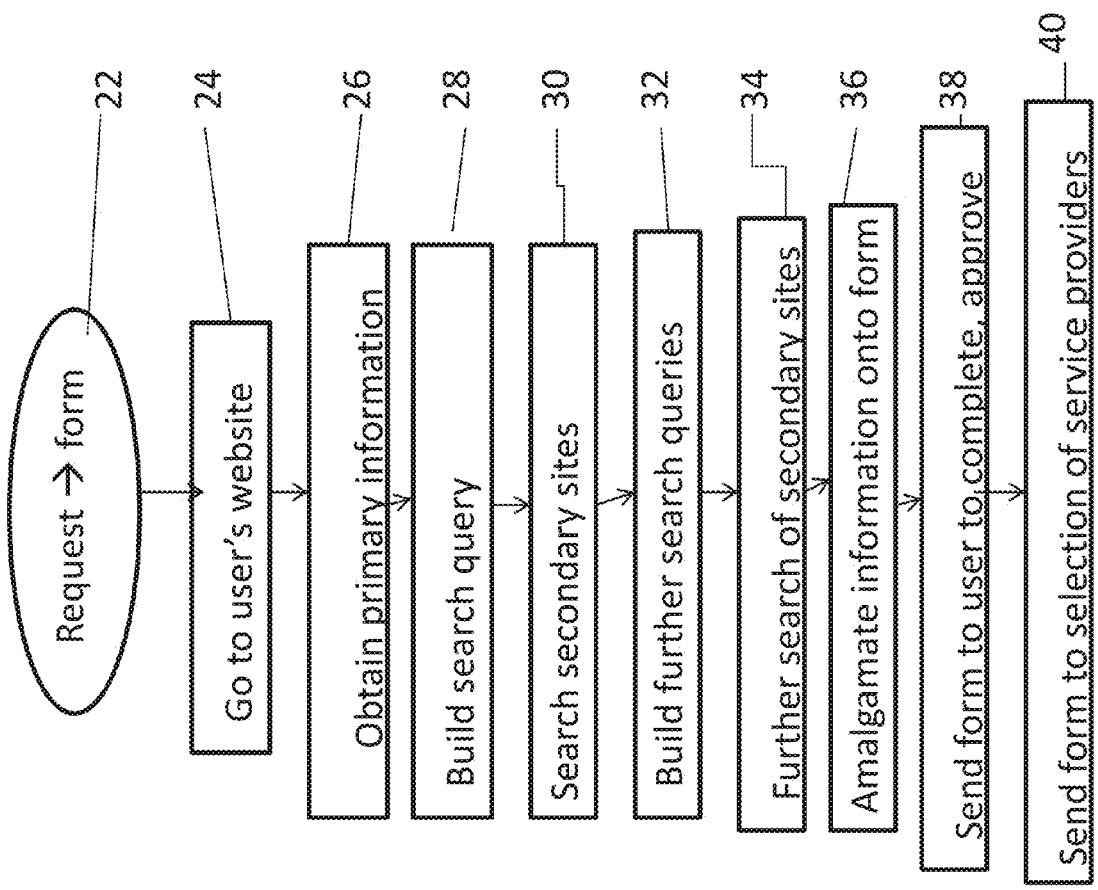
FIG. 2 is a simplified flow chart illustrating a variation of the embodiment of FIG. 1 wherein the request is for a service and the data is amalgamated onto a form.

Reference is now made to FIG. 2, which is a simplified flow chart showing a more detailed version of the embodiment of FIG. 1.

In FIG. 2, the request relates to a required service which is ordered using specific information in a preset query involving multiple information fields. The preset query may be presented as a web form that is associated with the request in box 22.

In box 24 the method goes to the user's web site as before to obtain the seed or primary information in box 26. The initial search query is built in box 28. Secondary web sites are searched in box 30, and further queries may be built using the results in box 32, leading to further searching of secondary sites in box 34. In box 36, amalgamation of the data is carried out by entering onto corresponding fields on the form. In box 38 the amalgamated data, which may include both seed and secondary information, is sent as a prefilled form to the requesting user for editing and confirmation. Editing may involve correcting fields that the search has filled incorrectly as well as filling in fields that the search has failed to find data for.

The edited and confirmed form may then be sent to various service providers to obtain tenders for the required service—box 40.

As mentioned, the primary, or seed, information may be contact information, and the contact information may be used to seed the query formation, by setting a search engine to initially look for information associated with that contact information.

Figure 3:
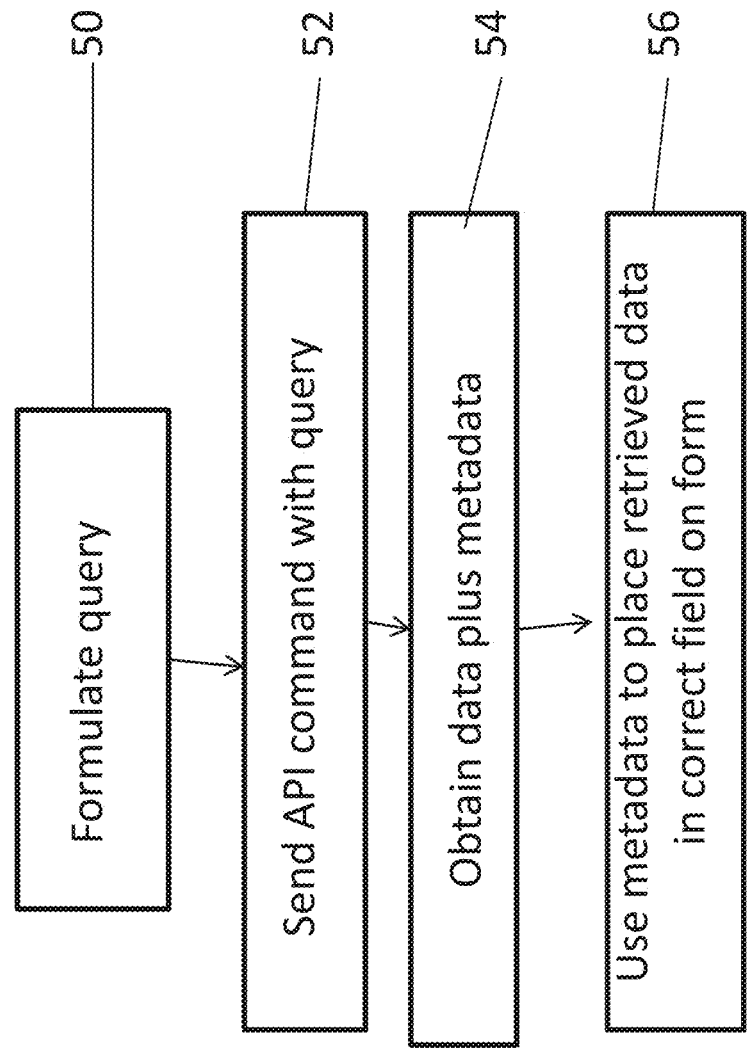
FIG. 3 is a simplified flow chart illustrating the use of a search engine API to obtain data together with metadata according to an embodiment of the present invention.

Reference is now made to FIG. 3 which illustrates obtaining of the associated secondary information. The query is formulated in box 50. Searching using the query may be carried out via an application programming interface (API) of a web search engine using an API command—box 52. The API can be used to obtain the data with associated metadata—box 54. The associated metadata may be used to associate data with a particular field in the data structure or form that needs to be filled in—box 56.

Figure 4:
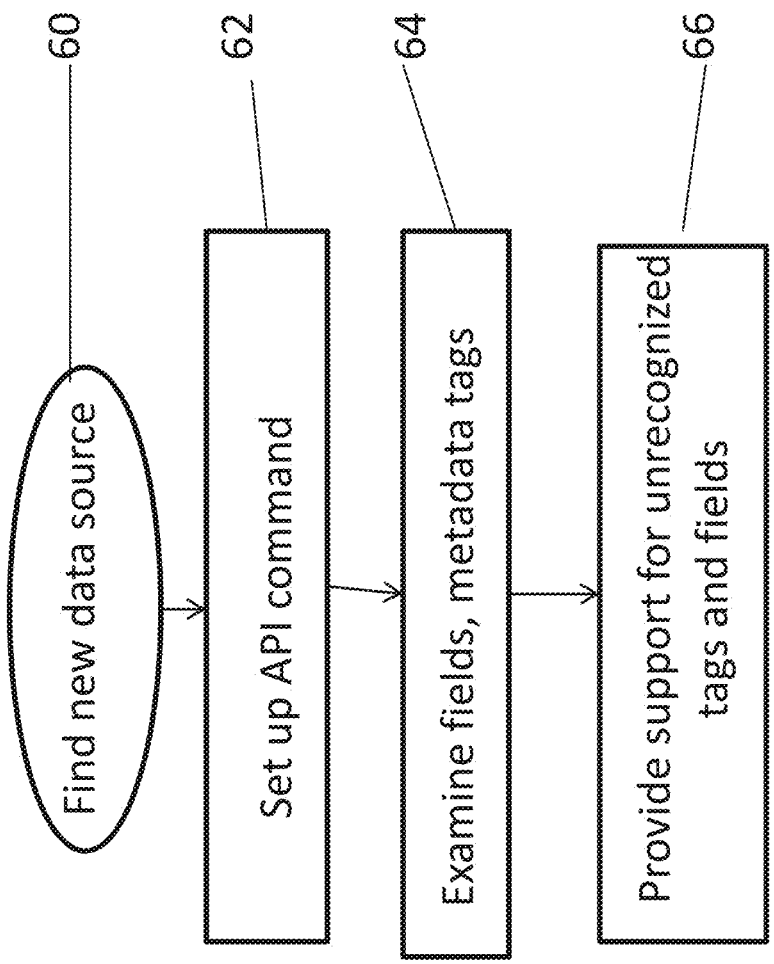
FIG. 4 is a simplified diagram illustrating a method of adding a new information source to the secondary sites searched in the present embodiments.

Reference is now made to FIG. 4, which is a simplified flow chart illustrating how a new data source can be added to the list of secondary information sources to be searched. A new website is discovered—box 60—that is felt to provide useful data and is not currently being used. An API call is set up—box 62—to relate to the new data source. The data source is analyzed for its structure and metadata—box 64. In box 66, support is provided for any as yet unrecognized data fields found in that data source. Thus, data sources may be added one by one, and as soon as the metadata of the data source is analyzed, the data in the source can be used to fill in data forms.

Thus, the initial and subsequent search queries search for data held within fields, and the fields are identified by metadata that is retrieved along with the data itself.

The primary search may also be a structured data search looking for data held within fields on the information source associated with the end user. As always the fields are identified by metadata as much as possible.

Although the secondary web sites may have support built in to recognize the specific data fields, the web sites associated with the users may not. Metadata tags may be non-standard and tables of alternative tags used for the same data may be used to help identify the different fields.

Considered now in greater detail, the idea is to leverage the public information that is available on the internet for gathering the data on a business based on their website address.

The present embodiments may extract the website URL and search it in a predefined list of sites such as Yelp. The search is carried out using a search engine such as Google™ which returns the data from the Yelp site in metadata form which can then be queried for specific fields such as contact, email etc. and fetch their values.

One item of information that may be obtained is the type of business. The way that the type of business information is held varies by site. For example, in one site the field holding the type of business might be labelled "category" and in another it might be labelled "industry". Thus, a process of recognizing the particular website is used in order to determine how the relevant data elements are held if they are available.

The process of familiarization may require manual addition of a new site and include a review of the information it provides and how that information is made available. The review generally relates to the metadata and field names and the like so that the review is robust to changes on the website. Thus, if changes are made on the website then these may appear directly in the results. In some cases, where variations between websites are foreseeable, an automated mechanism can assist the integration process using a list of phrases.

The end user now provides a query. For example, the query may be for insurance for his landscape gardening business.

The present embodiments capture all the data that is relevant to the query from the user's business website, and a screen presents the data for the quote to the end user. The data may be presented as a prefilled form with an option to edit, and then, when the end user is happy with the form, a click obtains a quote based on the form data. As discussed, the preview of the web page only noted the metadata, so that changes to the user's business that have taken place in the meantime may be picked up by the form since the metadata stays substantially the same.

In order to generate the form, the present embodiments may leverage the search engine's provided mechanisms for cataloguing information about the web-sites that the search engine scans. A search engine such as Google™ provides such information via a Search API.

Thus, once provided with the end user's web-site or business name, it is possible to invoke the search engine's provided API and obtain structured data of the end-user's business website, including contact information.

The search engine's search API may then be used a second time to look for business data from other sites, for example Yelp™ and Yahoo™. The additional searching may obtain information that is not found on customer's web-site, for example NAICS and/or SIC codes that identify the industry/business type.

In all cases, the response comes directly from the search engine API and there is no need to retrieve and parse information from the end-user's web-site or directly scan the websites from which the information is sourced. The present embodiments however do combine structured data obtained from multiple API calls.

The website address provides initial information, and the initial information may be used for second and third cycles of web searching to retrieve additional information. The information retrieval is for a predefined purpose, typically to answer a predefined query, and two examples of such queries are as follows:

Insurance quoting—The present embodiments may provide an automated insurance agent for business-type insurance. The automatic data gatherer is able to obtain data and propose suitable insurance products to protect the business described in the website. Insurance coverage may be provided for General Liability, Property, Bond, Workers compensation etc. after being provided with the website domain only, or with minor additional questions, and with further searching of the web based on data obtained from the website.
  Service Recommendation. An ability to provide a business with additional relevant services based on the business profile. An embodiment may offer small business and site owners relevant services based on the data retrieved by the multi-level search.

The process may start with the user entering their business website address. The present embodiments use the entered URL as a unique identifier and query different sites, using an available search engine such as Google™ to get the information they provide into one super-set of data.

The search engine is a Meta search that retrieves commercial and personal information that is available on the public Internet.

Subsequent searches are done at secondary web sites using data retrieved from those initial searches. An example would be a business phone number found at the initial web set. The phone number can then be used to formulate queries for sites that store phone numbers.

Secondary search sites that may be used in the later searches may currently include: Yelp, manta, yahoo local, Facebook, Craigslist—which is searched using a phone number—and Angie's List. Yes, yelp and yahoo are examples of secondary web-sites that are also queried via Google™ Search API. The search engine itself does the necessary preprocessing to obtain structured data from the secondary web sites.

If a desired information source, typically a new website, is not one that is handled by the search engine then it is possible to creating an additional call to the search engine API, requesting a metadata search to be performed within the web site. If the response contains previously unhandled fields, it is possible to add logic to support the new and unrecognized fields. Relying on and supplementing an existing search engine is easier and less demanding of resources than implementing HTTP scraping for each new information source.

The query prompts the primary and secondary searches to obtain information which may then be used to generate a prefilled web form. The form is sent to the end user who may confirm or modify the form, and then the form is sent to the insurance carriers or other providers. The end-user is free to confirm or modify the information fetched via the search engine, and fill in any blanks remaining on the form.

In an example, fetching personal information such as an address is possible by using a phone number as a query and using White pages. The address thus retrieved can be used as a search query on say the website Zillow™ to complete the house information (Year built in/Square foot/House value/Cooling system/Heating system/Security system/Flooring/Hardwood). Information such as marital status, Date of birth and place of work can be obtained from social media sites such as Facebook and Linked-in, based on a search query and a knowledge of the data layout in the particular social media site.

As mentioned, in an example, the data being collected may be for the purposes of providing insurance quotes. In such an example a server operates as an automated insurance agent. The user supplies the business website of the business requiring insurance. Business websites are generally mutually incompatible but certain information is generally provided by such sites, such as the nature of the business, location and contact information. Certain information collected from the website may be used to seed secondary searching on the Internet.

The aggregated data to be collected in the insurance quote example may include any or all of the following:

Business category (SIC, NAIC), business registration (LLC, cooperation, etc), Business name, contact/owner First & Last name, email, Year started (business established), Number of employees, Phone #, Full business address, Annual sales, Annual payroll, Business location (rent/home office/own), Total square footage, Any Subcontracted work.

In the insurance quote example, the search may look for phrases of particular significance to the particular type of insurance in order to classify the risk properly. For example: in the landscaping industry, standard carriers will not underwrite a landscaper who does snow plowing, or tree trimming. The initial search of the business website and related sites may thus look for phrases such as: "snow plowing", "tree trimming" "tree work". If the phrases are found then it will be apparent that the website owner is not eligible for the standard market in this kind of insurance and the query being built will instead look for the excess and surplus carriers.

As explained, the data obtained may then be sent to the user as a partially completed form for verification. Once verified, the form may be sent to the relevant insurance carriers from the agent's server in order to obtain quotes for the user.

Figure 5:
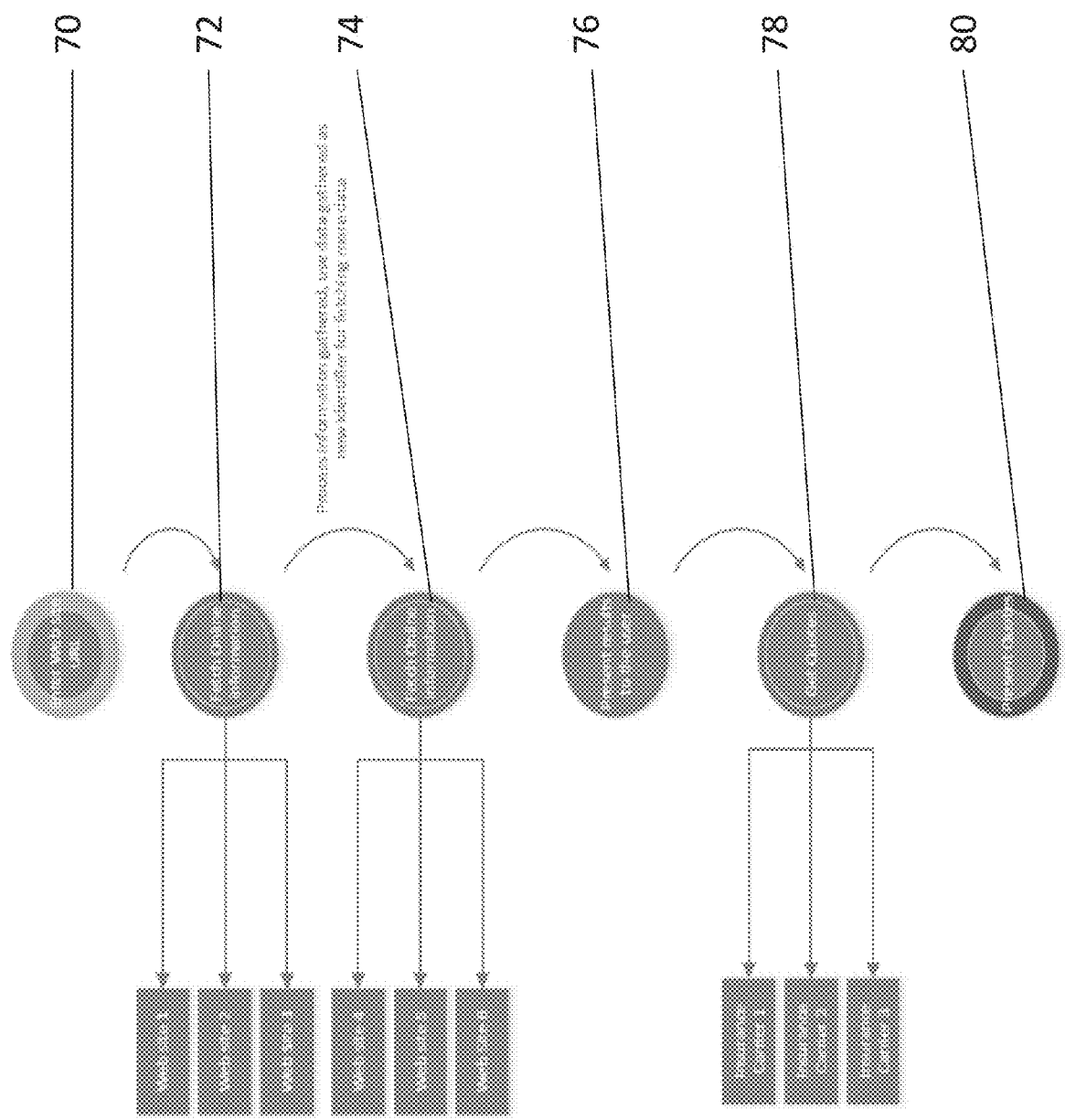
FIG. 5 is a simplified schematic diagram illustrating exemplary use of the present embodiments for obtaining quotes for insurance.

Reference is now made to FIG. 5, which is a simplified diagram illustrating a more detailed exemplary embodiment of how the present invention may be used to obtain insurance quotes. In FIG. 5, the request for insurance is initially associated with the URL of a website associated with the requestor and the website defined by the URL is entered— box 70. Online information, which may initially be contact or other seed information is used to formulate queries and the queries are used to search web sites 1 . . . 3—box 72. The information obtained is used to formulate new queries which are used to search websites 4 . . . 6 box 74. The resulting data is presented to the user in amalgamated form—box 76, and then, following editing and approval, is sent to insurance carriers 1 . . . 3 in box 78. Finally in box 80, the quotes are presented to the user.

Figure 6:
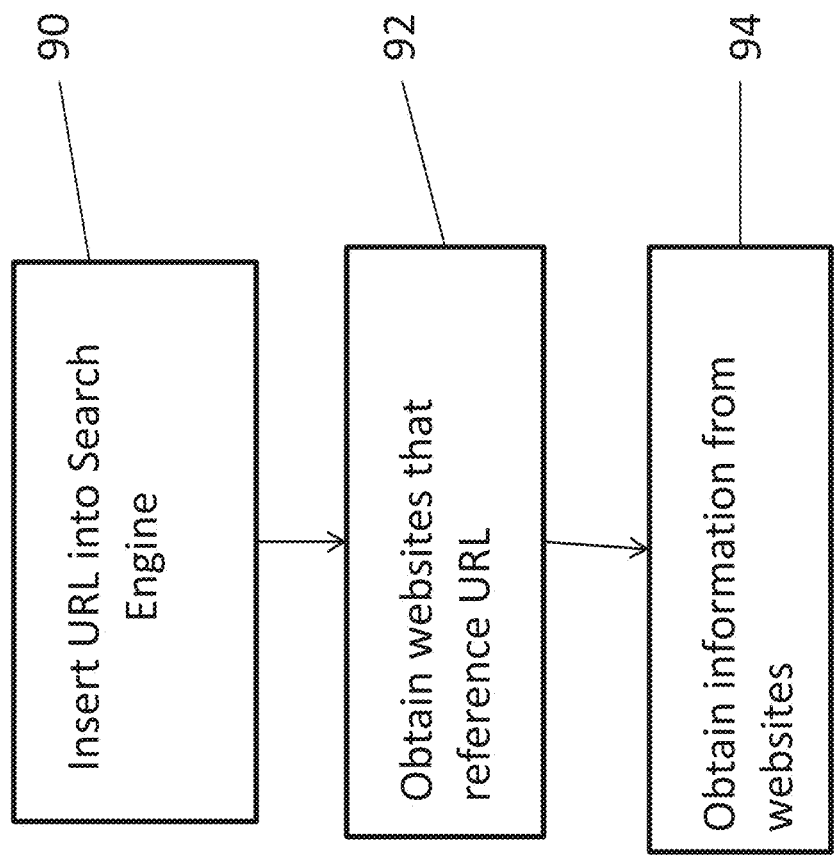
FIG. 6 is a simplified flow chart illustrating a procedure in which primary information is a URL which is inserted directly into a search engine, according to an embodiment of the present invention.

Reference is now made to FIG. 6, which is a simplified flow chart illustrating an alternative embodiment of the present invention. In the embodiment of FIG. 6, the primary data is the URL of the website of the entity making the request. In box 90 the URL is entered directly into a search engine. The search engine retrieves any website that references the original website 92 and then the retrieved websites may be analyzed in order to fill in the request form.

Reference is now made to FIG. 7, which is a simplified diagram illustrating another embodiment of the present invention. In this case the request is received from a mobile device—box 100. The requesting device is queried for its geolocation, box 102, and the geolocation is translated into the address of a property in box 104. Once the address has been obtained, suitable websites can be accessed to obtain details of the property which can then be used to complete requests for building insurance.

It is expected that during the life of a patent maturing from this application many relevant searching and data gathering technologies will be developed and the scopes of the corresponding terms are intended to include all such new technologies a priori.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment, and the above description is to be construed as if this combination were explicitly written. Conversely, various features of the invention, which are, for brevity, described in the context of a single embodiment, may also be provided separately or in any suitable subcombination or as suitable in any other described embodiment of the invention, and the above description is to be construed as if these separate embodiments were explicitly written. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of network-based data amalgamation on a plurality of computers networked together, the method comprising:
   obtaining a request from an end user, the request requiring predetermined information for fulfillment;
   operating an application programmer interface (API) of a web search engine to obtain seed information regarding said request in a primary search from an information source associated with said end user, said seed information comprising metadata, said information source having a first structure;
   using said metadata to parse said information source to obtain said first data structure;
   using said seed information to build at least one query for said predetermined information;
   operating said API to apply said at least one query to at least one additional information source at a second computer, said second computer having a second data structure, to obtain secondary information relating to said request;
   using said metadata to relate data fields in said second data structure to corresponding data fields in said first data structure; and
   amalgamating said seed and secondary information, using said relating of fields, to fulfill said request.

2. The method of claim 1, wherein:
   said request relates to a required service, said required service requiring to be ordered using said predetermined information in a preset query involving a plurality of information fields.

3. The method of claim 2, comprising presenting said seed and secondary information to said end user for editing and confirmation; and upon receiving said confirmation, sending said amalgamated seed and secondary information to one or more service providers to obtain tenders for said required service.

4. The method of claim 3, wherein said amalgamated seed and secondary information is placed within fields on a form designed for said preset query, any field for which information has not been found being left blank for filling in by said end user during said editing.

5. The method of claim 1, wherein said seed information comprises contact information, the contact information seeding said query formation.

6. The method of claim 1, wherein searching using said query is carried out via said application programming interface (API) of a web search engine.

7. The method of claim 6, comprising adding a new data source to said at least one additional data source for said search query search by introducing an API call and providing support for unrecognized data fields of said new data source.

8. The method of claim 1, wherein said query search comprises a search for data held within fields, said fields being identified by metadata.

9. The method of claim 1, wherein said primary search is a structured data search looking for data held within fields on said information source associated with said end user, said fields being identified by said metadata.

10. The method of claim 9, comprising selecting between a plurality of different metadata tags in general use, to identify required fields of said information source associated with said end user.

11. The method of claim 1, wherein said amalgamating comprises retrieving information from a plurality of API calls and combining said information into a single structure for said presenting to said end user.

12. The method of claim 1,
wherein said seed information comprises identifying information of a requesting party;
the method comprising using said identifying information to form at least one search query; and
using said API with said search query to electronically search a predetermined set of data sources over an electronic network to obtain said background information.

13. The method of claim 12, wherein said identifying information comprises a web site URL, said website URL being inserted as a formulated query into a search engine.

14. The method of claim 12, wherein said identifying information comprises geolocation information.

15. The method of claim 14, further comprising translating said geolocation information into an address.

16. The method of claim 15, further comprising using said address to obtain information about a building identified by said address.

17. Apparatus for network-based data amalgamation on a plurality of computers networked together comprising:
data processor;
an input configured to obtain a request from an end user, the request requiring predetermined information for fulfillment;
a first query unit configured to operate an application programmer interface (API) of a search engine to obtain seed information regarding said request in a primary search from an information source associated with said end user, said seed information comprising metadata, said information source being a first computer having a first data structure;
a parsing unit configured to use said metadata to parse said information source to obtain said first data structure;
a query builder configured to use said seed information to build at least one query for said predetermined information;
a second query unit configured to operate said API with said at least one query to at least one additional information source at a second computer having a second data structure to obtain secondary information relating to said request, said parsing unit using said metadata to relate data fields in said second data structure to data fields in said first data structure; and
an amalgamation unit configured to amalgamate said seed and secondary information, using said relating of data fields, to fulfill said request.

* * * * *